E. L. SCHUMACHER AND W. H. BOUTELLE.
OPHTHALMIC MOUNTING.
APPLICATION FILED FEB. 16, 1921.
1,384,862.
Patented July 19, 1921.
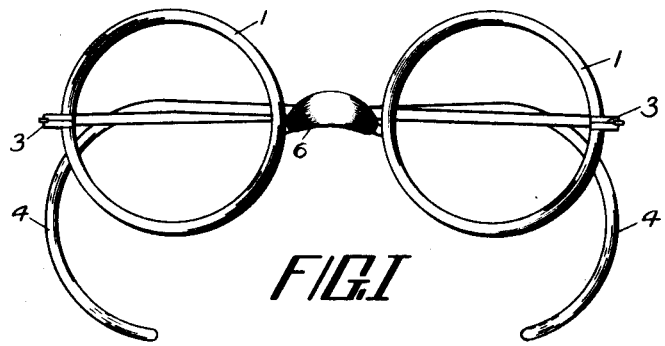
FIG. I
FIG. II
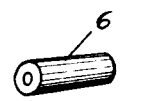
FIG. III
FIG. IV
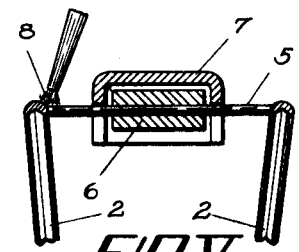
FIG. V
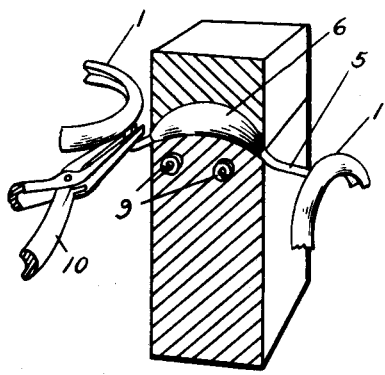
FIG. VI
FIG. VIII
FIG. VII
INVENTOR
ELMER L. SCHUMACHER
WILLIAM H. BOUTELLE
BY
H. H. Styll & H. H. Parsons
ATTORNEYS

UNITED STATES PATENT OFFICE.

ELMER L. SCHUMACHER, OF SOUTHBRIDGE, AND WILLIAM H. BOUTELLE, OF STURBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,384,862.   Specification of Letters Patent.   Patented July 19, 1921.

Application filed February 16, 1921. Serial No. 445,322.

*To all whom it may concern:*

Be it known that we, ELMER L. SCHUMACHER and WILLIAM H. BOUTELLE, citizens of the United States, residing, respectively, at Southbridge and Sturbridge, in the county of Worcester and State of Massachusetts, have invented certain new and useful Improvements in Ophthalmic Mountings, of which the following is a specification.

This invention relates to improvements in ophthalmic mountings and has particular reference to combination mountings or mountings embodying both metallic and non-metallic parts.

The principal object of the present invention is the provision of a novel and improved form of combination bridge or nose bearing member for a mounting of this character.

A further object of the invention is the provision of a new process of producing the particular bridge in question.

Other objects and advantages of our improvement should be readily apparent by reference to the following specification taken in connection with the accompanying drawings, and it will be understood that we may make any modifications in the specific details of construction shown and described within the scope of the appended claims without departing from or exceeding the spirit of our invention.

Figure I represents a front view of a mounting embodying our improvements.

Fig. II represents a plan view thereof.

Fig. III represents a perspective view of one form of blank for the non-metallic bridge member.

Fig. IV represents a similar view of the metallic bridge member.

Fig. V represents a sectional view illustrating a step in the process of construction of our improved mounting.

Fig. VI represents a similar view illustrating another step in the process.

Fig. VII represents a perspective view of a slightly modified form of bridge blank.

Fig. VIII represents a perspective view of a slightly modified bridge covering member.

In the drawings, the numeral 1 designates the outer non-metallic frame member which preferably incloses a metallic grooved frame member 2 provided with the usual end pieces 3 for attachment of the temples 4. The two metallic eye wires or frames 2 are intended to be connected as by a bridge member 5. It is most desirable in connection with so-called combination frames that the lenses be held in metallic frames, since these will best retain the parts in position and eliminate liability of loosening or tightening under the varying climatic conditions, and thus the possibility of twisting of the lenses, a serious proposition when a cylindrical correction is involved. It is also preferable from the viewpoint of the fitter to have the frames connected by a metallic bridge, since this facilitates proper adjustment and fitting of the frame to the face. On the other hand, there are many advantages in having the metal, where contacting with the face, provided with a composition or non-metallic covering. This is due to the fact that the non-metallic covering, such as 6, shown in the drawings, is more comfortable where resting on the nose, does not change temperature in the same way that a metallic mounting does, has a wider bearing surface than can be satisfactorily attained with the heavier metallic material, and prevents action of the acid from perspiration or the like from attacking the metal and causing discoloring of the face therefrom.

It is, therefore, the purpose of our invention to at once combine the desirable features of both the metallic and non-metallic bridge members in a single construction. It is further the object of our invention to provide a new process of combining these parts.

As shown in Figs. III and IV, we form a suitable bridge blank 5 of desired size and shape and then centrally mount thereon the non-metallic or composition tube 6. After this uniting we slip over the parts the asbestos or other heat-proof mask 7 and solder the termini of the bridge member 5 to the metallic eye wires 2, as at 8, making use of a blow pipe, electric soldering device or other desired mechanism for the purpose. After the parts have been secured together we remove the mask and place the member 6 within suitable heated dies or shaping members 9, as shown in Fig. VI. By reference to this figure it will be seen that the dies serve to compress the member 6 onto the central part of the bridge member tapering down the ends to properly fit and make a smooth joint with the metal and firmly unite the parts. At the same time and while the center is being held by these dies we preferably grasp the terminal projecting bridge ends as by the tools or clamps 10, and bend them upward until the lens frames 2 are in alinement one with the other and the mounting is properly adjusted. It may then be removed from the clamp dies 9 and is in condition for sale.

It is to be understood that while we have shown the bridge blank 5 in Fig. IV as of plain or straight material, that it may be differently formed as desired, either with the central enlarged portion 11, reduced portions 12 and shoulders 13 of the swelled portions 14, as shown in Fig. VII, or with other types of projections with which the material may interlock. The particular advantage of Fig. VII is that the non-metallic material may be pressed by the dies to just fit flush with the swelled portions 14 of the temple center and merge therewith, leaving a heavy terminal edge to the non-metallic member instead of being tapered down to a feather edge as shown in Fig. VI.

While we have described certain steps as one process by which our improved mounting may be constructed, it is to be understood that we do not wish to be specifically limited to this particular form, since the bridge member may if desired be partially shaped, as by tapering the ends as indicated in Fig. VIII or otherwise modified in shape before it is placed on the core or wire member 5 and similarly it may be formed either by pressing in hot dies or first heated and then inserted within suitable dies either hot or otherwise. It will also be understood that if preferred part or all of the shaping operation may be performed before the attachment of the metallic eyes to the member 5, all of these variations falling within the spirit and purpose of our invention as hereinafter claimed.

We claim:

1. An ophthalmic mounting including a bridge bar having a seamless non-metallic tube centrally disposed thereon and having exposed terminal portions projecting beyond the ends of the non-metallic tube.

2. An ophthalmic mounting including a bridge bar having a central arched portion and terminal portions for engagement with lens attaching devices and a covering for said central arched portion in the form of a seamless non-metallic tube mounted on the bridge bar and having its termini tapered to substantially merge with the adjacent exposed portions of the bridge bar.

In testimony whereof we have affixed our signatures in the presence of two witnesses.

E. L. SCHUMACHER.
WILLIAM H. BOUTELLE.

Witnesses:
 ALICE G. HASKELL,
 SUSAN CASAZZA.